United States Patent [19]

Laguilharre et al.

[11] 4,303,468
[45] Dec. 1, 1981

[54] MECHANICAL VAPOR RECOMPRESSION EVAPORATORS

[75] Inventors: Pierre R. Laguilharre, Enghien les Bains; Jacques J. Ciboit, Paris, both of France

[73] Assignee: Laguilharre S.A., Nanterre, France

[21] Appl. No.: 136,978

[22] Filed: Apr. 3, 1980

[30] Foreign Application Priority Data

Apr. 19, 1979 [LU] Luxembourg .......................... 81168

[51] Int. Cl.³ .............................................. B01D 1/26
[52] U.S. Cl. ............................. 159/47 R; 159/24 A; 159/24 B; 159/17 R; 203/26
[58] Field of Search ................. 159/24 R, 24 A, 24 B, 159/47, 17 R; 203/26

[56]  References Cited

U.S. PATENT DOCUMENTS 3,288,685  11/1966  Kemper et al. ....................... 203/26

FOREIGN PATENT DOCUMENTS 910281  1/1946  France ............................. 159/24 B
997501  7/1965  United Kingdom .............. 159/24 B Primary Examiner—Norman Yudkoff
Attorney, Agent, or Firm—Birch, Stewart, Kolasch and Birch

[57] ABSTRACT

The present invention relates to a process for providing make-up heat in a mechanical vapour recompression evaporator (1, 8, 9).

It includes using the evaporation vapour created in another evaporator (5) called make-up evaporator.

The invention finds particular application in the dairy industry.

6 Claims, 2 Drawing Figures

MECHANICAL VAPOR RECOMPRESSION EVAPORATORS

BACKGROUND OF THE INVENTION AND FIELD OF THE INVENTION

The present invention relates to a process for adding make-up heat to a mechanical vapour recompression evaporator.

If, in a mechanical vapour recompression evaporator, there is not sufficient heat available to obtain the balance between the incoming heat and the outgoing heat in the evaporation cycle, it is necessary to use a process bringing a complement of heat. In known processes, this input is generally effected by heating the product to be evaporated by means of condensates from the mechanical vapour recompression evaporator as well as by means of very expensive live steam.

SUMMARY OF THE INVENTION

With the aim of providing a more economical process, the present invention proposes providing make-up heat by using the vapour of evaporation created in another evaporator called make-up evaporator.

It will be understood that in this new process, the vapour used for making up is an economical vapour since it itself results from a vapour which has already served for evaporation.

It will be noted that the mechanical vapour recompression evaporator and/or the make-up evaporator may be formed by one of the actions of a multiple-action evaporator.

It is to be noted that the make-up evaporator may be a vapour thermocompression evaporator. In this case, the make-up vapour is even more economical since it itself has already served for evaporating in the thermocompression evaporator.

It is of course possible to associate a mechanical vapour recompressor with the vapour thermocompressor of the make-up evaporator.

According to a possible variation in the process of the invention, the vapour used for providing the make-up heat is a fraction of that directly issuing from the make-up evaporator, all or part of the reset of the vapour created in this latter being used, after compression, in the thermocompressor or in the mechanical vapour recompressor-thermocompressor association for heating said make-up evaporator.

In another variation, the vapour used for providing make-up heat is that coming from the thermocompressor or from the mechanical vapour recompressor-thermocompressor association, all or part of the vapour created in the mechanical vapour recompression evaporator and not subjected to mechanical recompression being used for heating the make-up evaporator. This variation relieves considerably the mechanical vapour recompressor of the evaporator for which it is desired to provide make-up heat.

It will be noted that the make-up evaporator may be used to continue concentrating the product coming from the mechanical vapour recompression evaporator. This make-up evaporator may in particular be a finisher.

BRIEF DESCRIPTION OF THE DRAWING

Described below, by way of example, and referring to FIGS. 1 and 2, are two evaporation installations implementing the process in accordance with the invention.

DESCRIPTION OF THE PREFERRED EMBODIMENT

Figure 1:
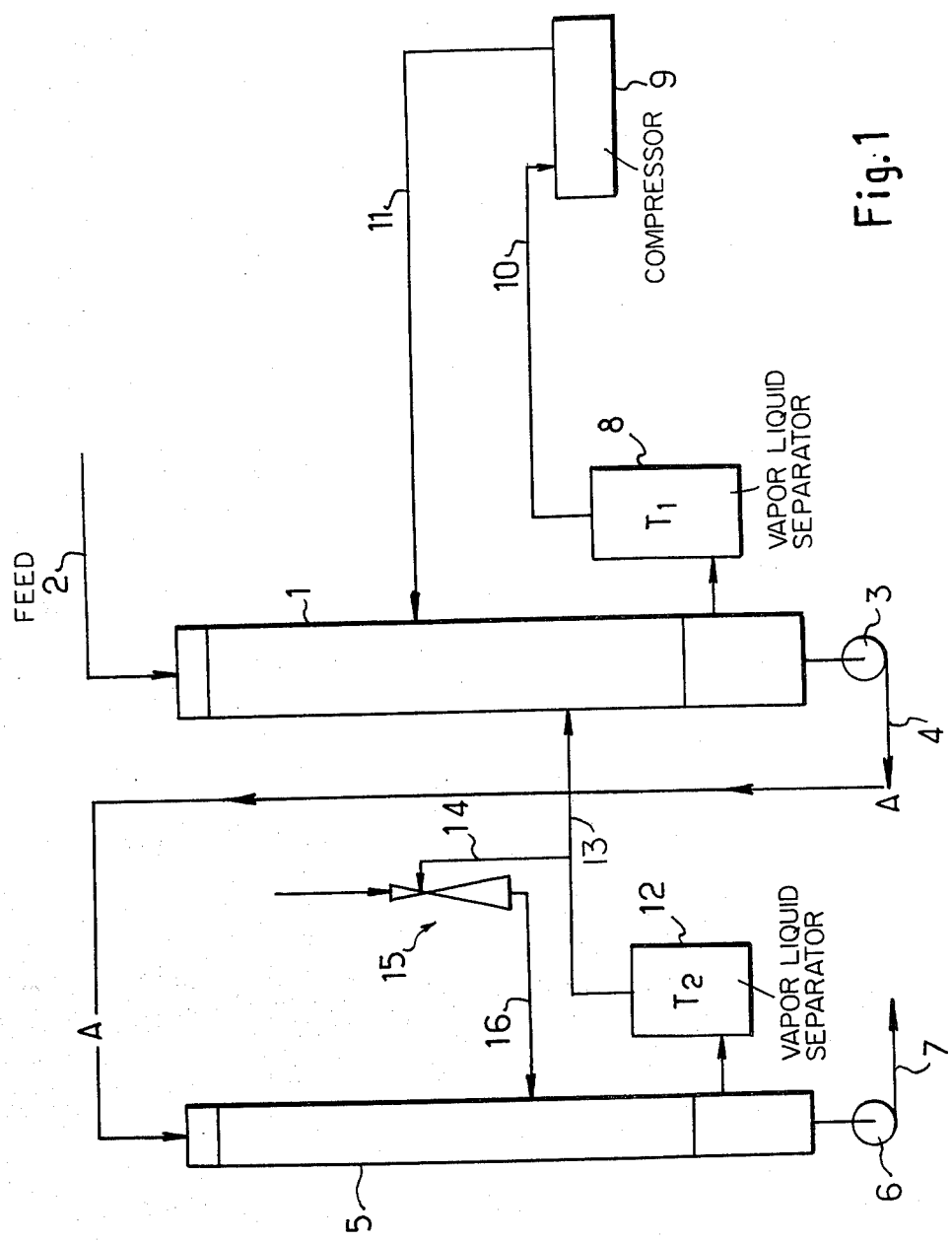

The installation shown in FIG. 1 comprises a falling-flow evaporator 1 receiving at the top through duct 2 the product to be concentrated, which may be for example a dairy product. The concentrated product is discharged at the base of the evaporator 1 and conveyed by a pump 3 and a duct 4 to the top of a second falling-flow evaporator 5, the so-called make-up evaporator, then discharged at the base of this latter by means of pump 6 and duct 7 towards the place where it will be stored or used. The evaporation vapour created in evaporator 1, after passing through a vapour-liquid separator 8, is fed into a mechanical vapour compressor 9 through duct 10 and is finally conveyed from this compressor 9 to the heating unit of evaporator 1 through duct 11. The evaporation vapour created in make-up evaporator 5 escapes at the base thereof to the vapour-liquid separator 12 from where it is then conveyed by duct 13 to the heating unit of evaporator 1, where it serves as make-up heat required for the operating cycle of evaporator 1. Duct 13 is by-passed by the suction pipe 14 of a vapour thermocompressor 15, which urges the mixture of sucked-in vapour and vapour required for operation of thermocompressor 15 into the heating unit of make-up evaporator 5 through duct 16.

Figure 2:
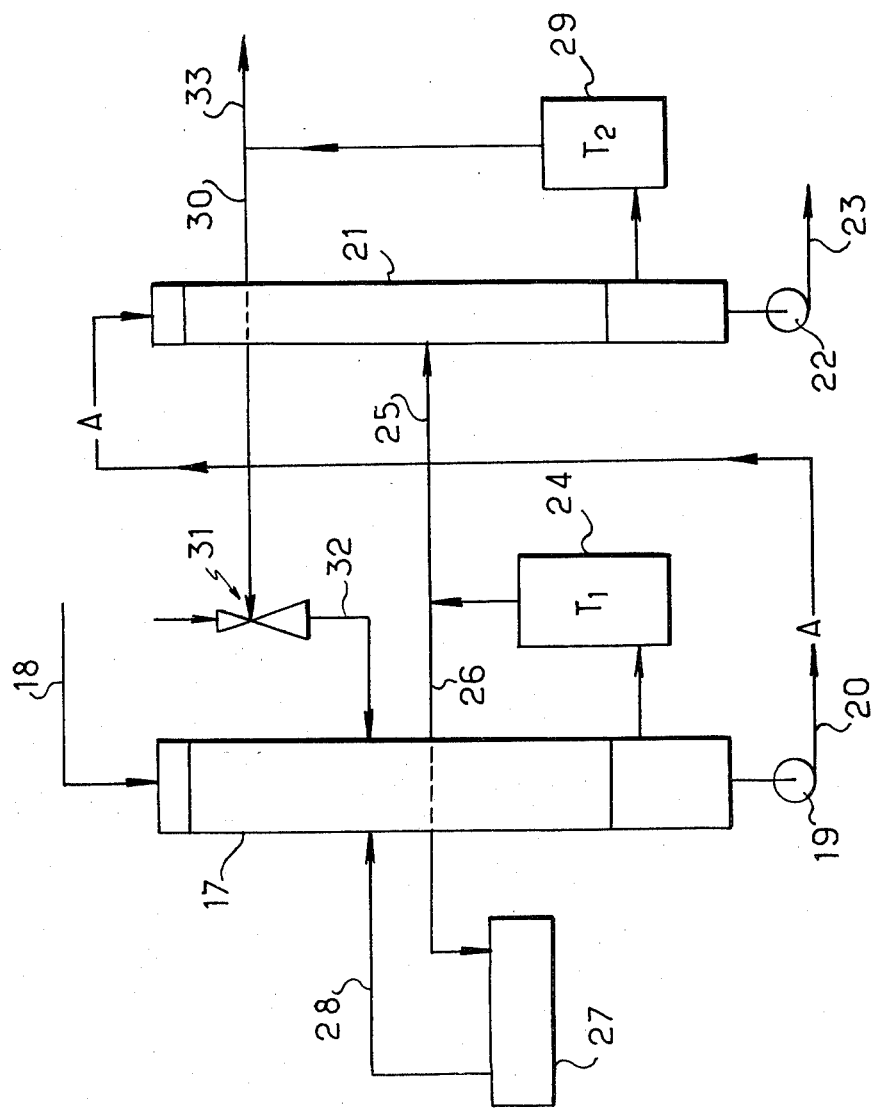

The installation of FIG. 2 comprises a single-acting falling-flow evaporator 17 supplied by duct 18 with a product to be concentrated, for example a dairy product, the product having undergone concentration being discharged at the base of evaporator 17 and conveyed by pump 19 and duct 20 to the top of a second falling-flow evaporator 21, the so-called make-up evaporator. The final product is then discharged at the base of this evaporator 21 by means of a pump 22 and a duct 23 towards the place where it will be stored or used. The evaporation vapour created in evaporator 17 passes through a vapour-liquid separator 24 and a part of the vapour from this separator is directed towards the heating unit of make-up evaporator 21 through duct 25. The rest of the vapour from separator 24 is brought by duct 26 to a mechanical compressor 27, then from this latter to the heating unit of evaporator 17 through duct 28. The evaporation vapour created in make-up evaporator 21 passes through a vapour-liquid separator 29 and all or part of the vapour from this separator is sucked through duct 30 towards thermocompressor 31, the mixture formed by this sucked-in vapour and by the vapour used for operating said thermocompressor then being directed to the heating unit of evaporator 17 through duct 32. The vapour from separator 29 and not sucked in through duct 30 is directed by duct 33, for example towards a condenser or a heater of the product to be concentrated.

In the installation of FIG. 1, the temperature $T_2$ in separator 12 is higher than temperature $T_1$ in separator 8; this installation may then be used for concentrating a product insensitive to the temperature in the concentrated condition. On the contrary, in the installation of FIG. 2, the temperature $T_2$ in separator 29 is lower than temperature $T_1$ in separator 24; this installation will for this reason be preferably used for treating a product sensitive to the temperature in the concentrated condition.

It will be noted that evaporators 1 and 17 could be multiple-acting and of a different type from a falling-flow evaporator. The same can be said for make-up evaporators 5 and 21, in which case duct 33 would not longer be connected to a condenser or a heater of the product to be concentrated, but to the heating unit of another action. Furthermore, vapour thermocompressors 15 and 31 could each be associated with a mechanical vapour recompressor, the thermocompressor and the recompresor then being disposed in series.

Of course, it is possible to use only a part of the vapor circulating through the ducts 14 and/or 16 and 25, for heating the make-up evaporator. The rest of the vapor may be used at another place of the installation or in another installation.

We claim:

1. A process for providing make-up heat in a mechanical vapour recompression evaporator which comprises introducing the product to be concentrated into a first evaporator, introducing the concentrated product discharged from said evaporator to a second make-up evaporator, the vapour created as a result of the condensation process in said first evaporator being conveyed after processing to the heating unit of said first evaporator, the evaporation vapour created in said make-up evaporator being directed through a vapour-liquid separator to the heating unit of said first evaporator where it serves as make-up heat for the operating cycle of said first evaporator.

2. A process according to claim 1 characterized in the evaporator system comprises a mechanical vapour recompression evaporator.

3. A process according to claim 2 characterized in that said make-up evaporator comprises a vapour thermocompression evaporator.

4. A process according to claim 3 characterized in that a mechanical vapour recompressor is associated with said vapour thermocompression evaporator.

5. A process according to claim 4, characterized in that the vapour used for providing make-up heat is a fraction of that directly issuing from the make-up evaporator, the rest of the vapour created in the make-up evaporator being used, after compression in the thermocompressor or in the mechanical vapour recompressor-thermocompressor association for heating said make-up evaporator.

6. A process according to claim 4, characterized in that the vapour used for providing make-up heat is from the thermocompressor or from the mechanical vapour recompressor-thermocompressor association, the vapour created in the mechanical vapour recompression evaporator and not subjected to mechanical recompression being used for heating the make-up evaporator.

* * * * *